United States Patent
LoRusso

(10) Patent No.: US 8,375,249 B1
(45) Date of Patent: Feb. 12, 2013

(54) METHOD FOR TESTING BATTERY BACKUP UNITS

(75) Inventor: Anthony J. LoRusso, Arlington, MA (US)

(73) Assignee: EMC Corporation, Hopkinton, MA (US)

( * ) Notice: Subject to any disclaimer, the term of this patent is extended or adjusted under 35 U.S.C. 154(b) by 509 days.

(21) Appl. No.: 12/233,619

(22) Filed: Sep. 19, 2008

(51) Int. Cl.
*G06F 11/00* (2006.01)

(52) U.S. Cl. ............. 714/22; 714/25; 700/286; 700/292

(58) Field of Classification Search .................... 714/25; 600/513; 379/106.01–106.03; 702/182–183; 700/286–294; 307/65, 66, 71, 80, 81, 85–87, 307/127; 324/427–433, 750.3
See application file for complete search history.

(56) References Cited

U.S. PATENT DOCUMENTS

| | | | | |
|---|---|---|---|---|
| 4,553,213 A * | 11/1985 | Hyatt | ............................ | 332/185 |
| 4,977,527 A * | 12/1990 | Shaw et al. | ..................... | 702/85 |
| 5,416,416 A * | 5/1995 | Bisher | ........................... | 324/426 |
| 5,418,403 A * | 5/1995 | Morell, III | ...................... | 307/72 |
| 5,528,149 A * | 6/1996 | Chen | ............................. | 324/433 |
| 5,576,941 A * | 11/1996 | Nguyen et al. | ............. | 363/21.07 |
| 5,625,583 A * | 4/1997 | Hyatt | .............................. | 365/45 |
| 5,646,509 A * | 7/1997 | Berglund et al. | ............. | 713/321 |
| 5,726,573 A * | 3/1998 | Chen et al. | ..................... | 324/429 |
| 5,751,217 A * | 5/1998 | Kchao et al. | ............. | 340/636.16 |
| 5,886,503 A * | 3/1999 | McAndrews et al. | ......... | 320/121 |
| 6,278,279 B1 * | 8/2001 | Daun-Lindberg et al. | .... | 324/427 |
| 2002/0183971 A1 * | 12/2002 | Wegerich et al. | ............. | 702/185 |
| 2004/0078171 A1 * | 4/2004 | Wegerich et al. | ............. | 702/188 |
| 2006/0036403 A1 * | 2/2006 | Wegerich et al. | ............. | 702/183 |
| 2006/0122525 A1 * | 6/2006 | Shusterman | .................. | 600/513 |
| 2007/0146189 A1 * | 6/2007 | Wesselink et al. | ............ | 341/155 |

* cited by examiner

*Primary Examiner* — Scott Baderman
*Assistant Examiner* — Jeison C Arcos
(74) *Attorney, Agent, or Firm* — Krishnendu Gupta; R. Kevin Perkins

(57) ABSTRACT

A method for testing a battery backup unit used to power electronic components stored in an enclosure, such enclosure including a cooling system have a fan, such electrical components and fan being powered by a power supply electronic components stored in an enclosure, such enclosure including a cooling system have a fan, such electrical components and fan being powered by a power supply and, in the event of a detected failure of the power supply to provide proper power, the battery backup unit. The method includes periodically interrupting the power from the power supply to the fan while the fan is supplied power from the battery backup unit to test the battery backup unit while the power supply maintains power to the electrical components.

10 Claims, 4 Drawing Sheets

METHOD FOR TESTING BATTERY BACKUP UNITS

TECHNICAL FIELD

This invention relates generally to battery backup unit testing.

BACKGROUND

As is known in the art, large host computers and servers (collectively referred to herein as "host computer/servers") require large capacity data storage systems. These large computer/servers generally includes data or storage processors, which perform many operations on data introduced to the host computer/server through peripherals including the data storage system. The results of these operations are output to peripherals, including the storage system.

One type of data storage system is a magnetic disk storage system. Here a bank of disk drives and the host computer/server are coupled together through an interface. The interface includes "front end" or host computer/server controllers (or directors or storage processor) and "back-end" or disk controllers (or directors or storage processor). The interface operates the controllers (or directors or storage processor) in such a way that they are transparent to the host computer/server. That is, data is stored in, and retrieved from, the bank of disk drives in such a way that the host computer/server merely thinks it is operating with its own local disk drive. The data passes through the storage processor The interface may also include, in addition to the host computer/server controllers (or directors or storage processor) and disk controllers (or directors or storage processor), addressable cache memories. The cache memory is a semiconductor memory and is provided to rapidly store data from the host computer/server before storage in the disk drives, and, on the other hand, store data from the disk drives prior to being sent to the host computer/server. The cache memory being a semiconductor memory, as distinguished from a magnetic memory as in the case of the disk drives, is much faster than the disk drives in reading and writing data.

As is also known in the art, the interface may be required to store data that is still "in-flight" from a host network intended for storage onto its hard-drive array in the event of a power failure. This "in-flight" data normally flows through a volatile write cache within the system's main memory. This write cache provides a high-level of network performance. If the system encounters a power loss, the write cache data that has not been committed to the hard-drive array would be lost, resulting in a data storage loss of valuable customer data.

In one system a Battery Backup Unit (BBU) is provided. When the interface senses a loss of main power, the on-board Battery Backup Unit (BBU) provides enough energy to keep a low-power level "data vaulting" process running on the interface. This low-power "data vaulting" process enables the interface to store the "in-flight" write cache data into a non-volatile storage medium for later recovery. BBU testing in accordance with the prior art is usually performed by periodically switching to the battery pack. For example, in order for this write cache to remain enabled during the interface's operation, the BBU must be trusted to have enough energy storage to be able to power the write-cache data vaulting operation through to completion. In order for the interface to trust the BBU, the BBU must be periodically tested in between its normal charging cycles. The normal method to test a battery unit is to provide a sufficient load, and measure its output voltage. This would risk interface failure should the batteries not have enough power storage. More particularly, loading the BBU with a CPU director Module, as would be done with the vaulting operation, would be too risky during normal interface operation.

SUMMARY

In accordance with the present invention, a method is provided for testing a battery backup unit used to power electronic components stored in an enclosure, such enclosure including a cooling system have a fan, such electrical components and fan being powered by an external power source during a normal operating mode electronic components stored in an enclosure, such enclosure including a cooling system have a fan, such electrical components and fan being powered by a power supply and, in the event of a detected failure of the power supply to provide proper power, the battery backup unit. The method includes periodically interrupting the power from the power supply to the fan while the fan is supplied power from the battery backup unit to test the battery backup unit while the power supply maintains power to the electrical components.

With such method, the battery backup unit is presented with a sufficient load to facilitate power-state testing without the risk running the electrical components (as the batteries would do in a power-down situation).

In one embodiment, fan-speed sensors, may be utilized to gauge the effectiveness of the battery backup unit power delivery during the load test.

In one embodiment, the battery backup unit output voltage may also be monitored.

In one embodiment, the fan unit input current may also be monitored.

In one embodiment, a system interface is provided for transferring data between a host computer/server and a bank of disk drives. The system interface includes an enclosure, such enclosure having therein: a storage processor for controlling data transfer between the host computer/server and the disk drive; a power supply; a battery backup unit fed by the power supply; a fan unit; a controller; a first switch fed by the power supply and the battery backup unit, such controller coupling either the power supply or the battery backup unit to the fan unit selectively in accordance with a fan power control signal produced by the controller; and a second switch fed by the power supply and the battery backup unit, such controller coupling either the power supply or the battery backup unit to the storage processor selectively in accordance with a CPU power control signal produced by the controller. The controller periodically operates the first switch to decouple the power supply from the fan while coupling the battery backup unit to power the fan while coupling the power supply through the second switch to power the storage processor.

The details of one or more embodiments of the invention are set forth in the accompa-nying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
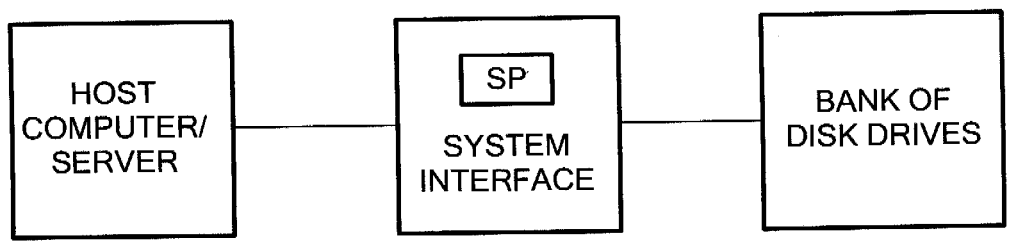
FIG. 1 is a block diagram of a system interface for transferring data between a host computer/server and a bank of disk drives in accordance with the invention.

FIG. 1 shows a data storage system, or system interface 10 configured to manage data transfer between a host computer/server 12 and a bank of disk drives 14. As shown in FIG. 1, the data storage system 10 includes a storage processor 16 for controlling the data transfer.

Figure 2:
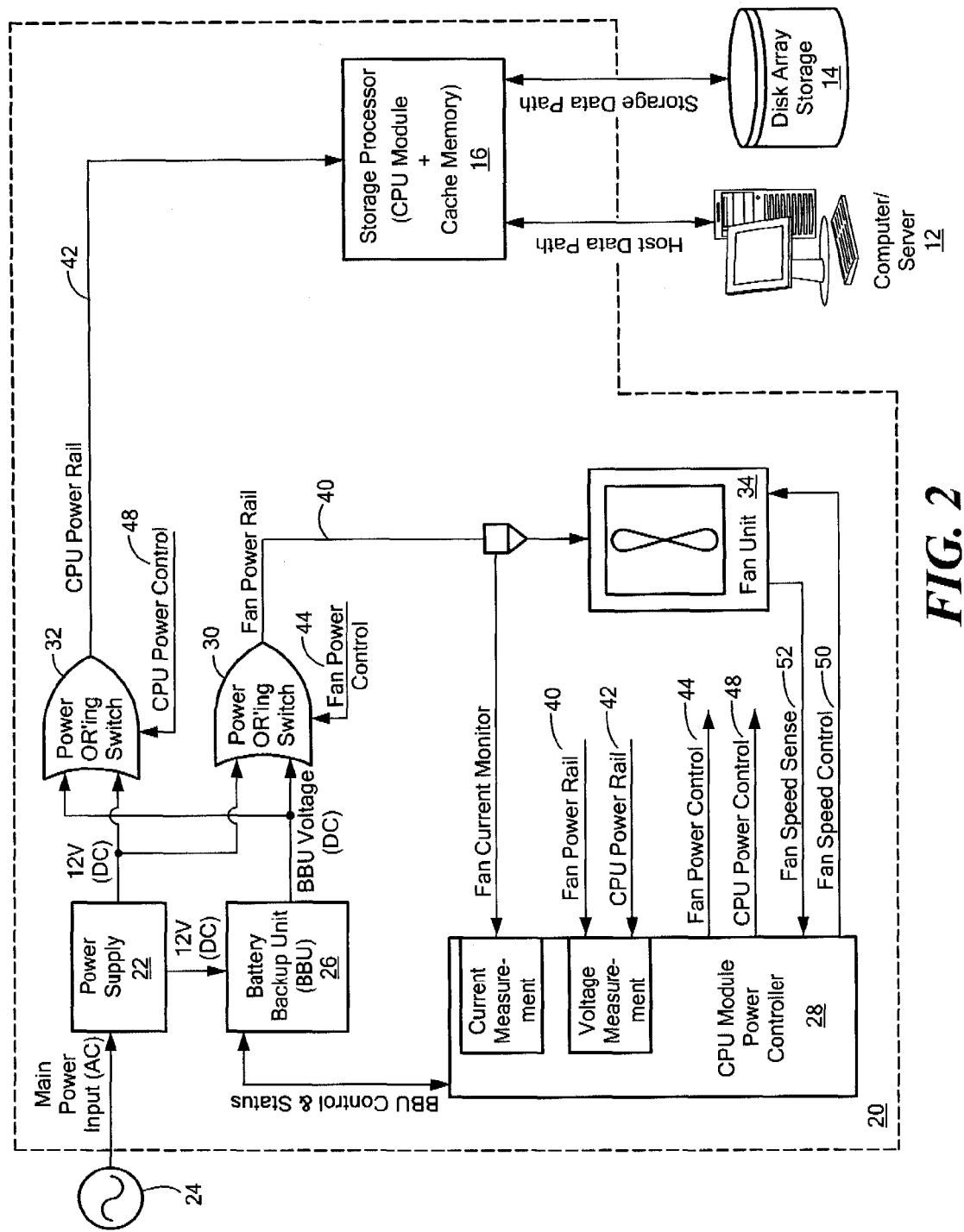
FIG. 2 is a block diagram of an enclosure having a storage processor for controlling the data transfer in the system of interface of FIG. 1 and circuitry for testing a battery backup unit used in the enclosure in accordance with the invention.

Referring now to FIG. 2, the storage processor 16 is disposed in an enclosure 20. The enclosure 20 is shown in more detail to include as components therein: a power supply 22 adapted for coupling to an external power source 24; a battery backup unit (BBU) 26; the storage processing circuitry 16 having a controller (CPU) module and volatile-memory storage cache; a CPU module power controller 28; a pair of power OR'ing circuits 30, 32 (e.g., switches); and a cooling system having a fan section 34, all arranged as shown are included within the enclosure 20.

Figure 3:
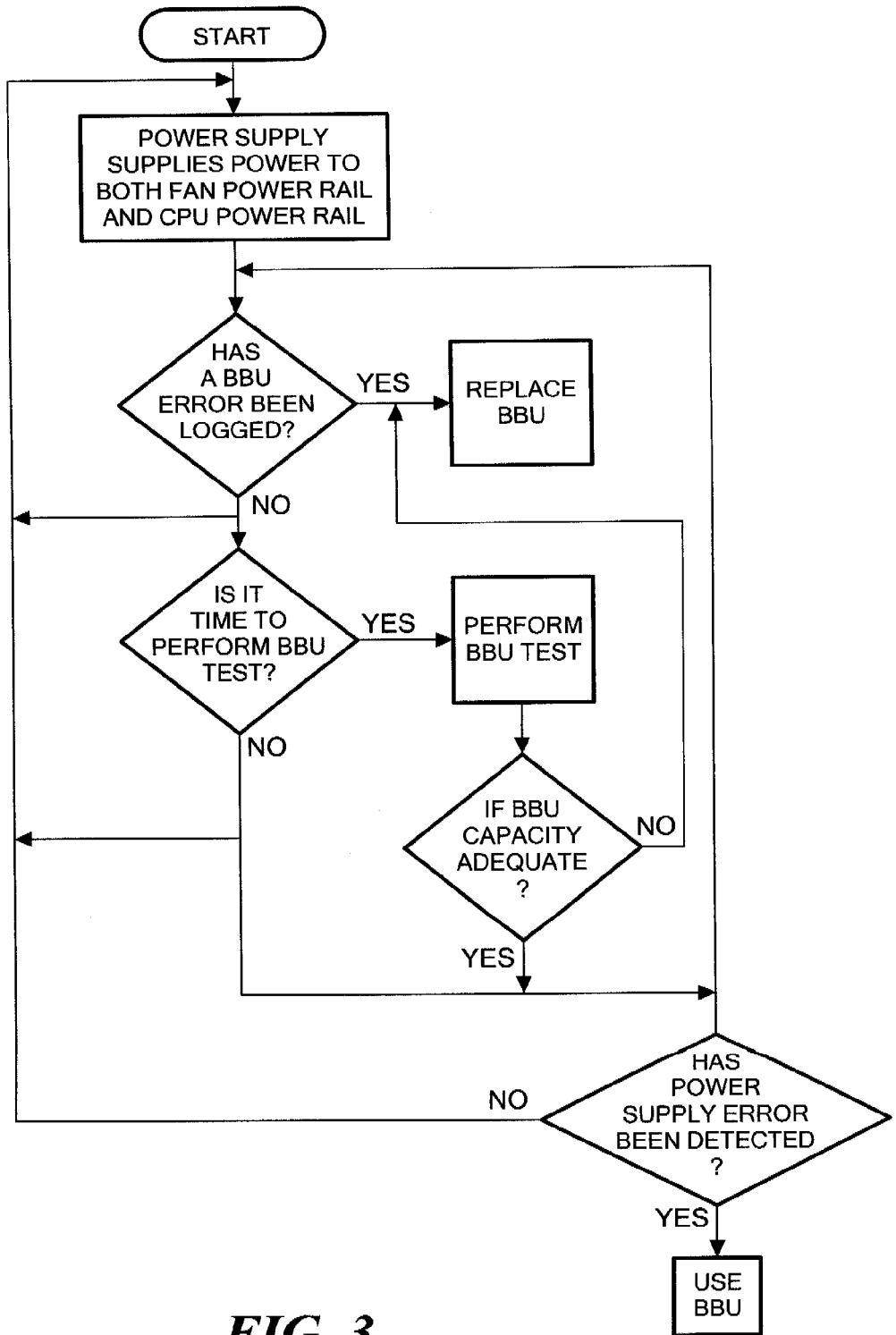
FIG. 3 is a flowchart of a method for testing the battery backup unit in accordance with the invention.
Figure 4:
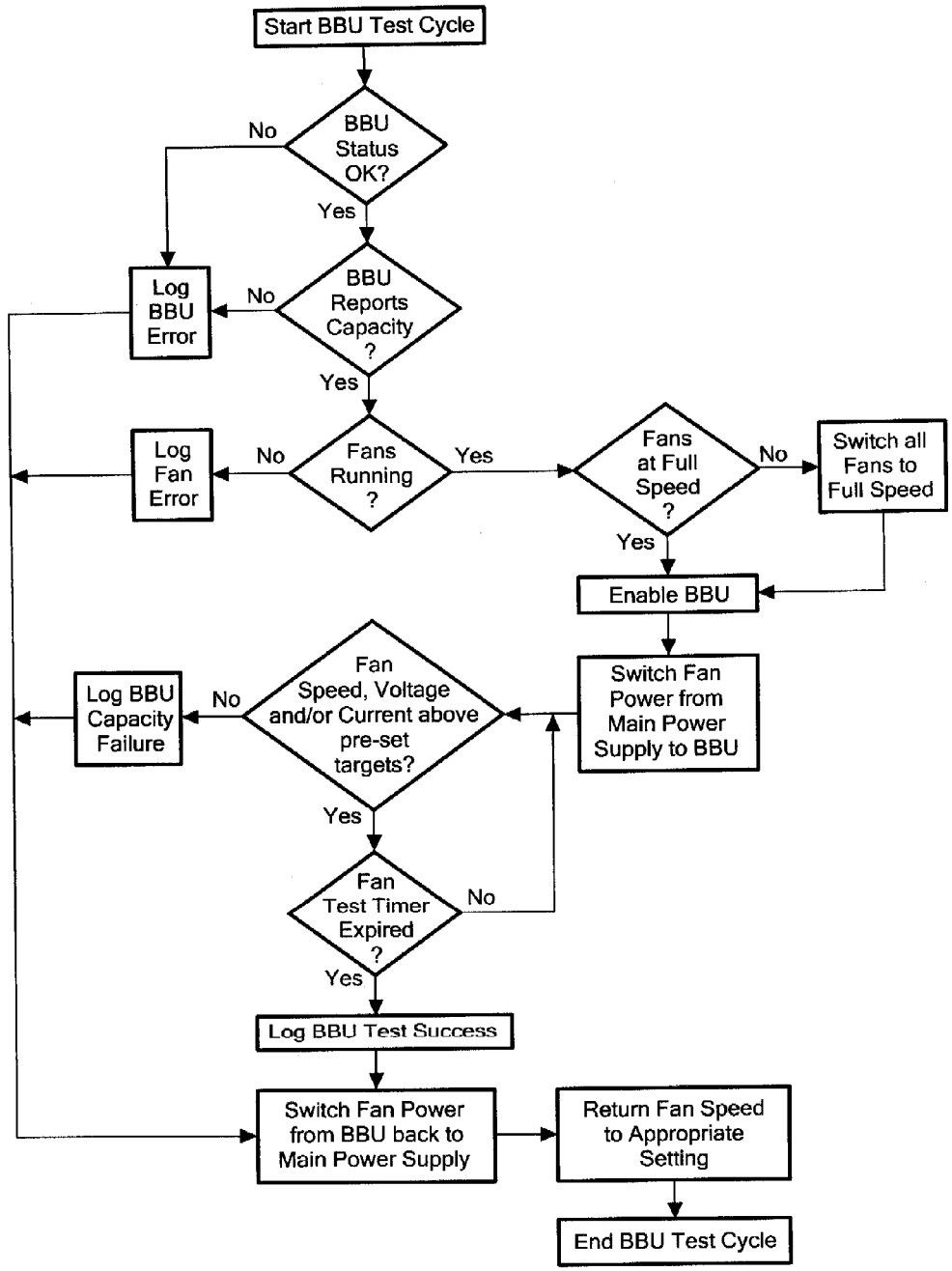
FIG. 4 is a more detailed flowchart of a method for testing the battery backup unit in accordance with the invention.

The CPU Module Power Controller 28 is programmed in accordance with the flowchart in FIGS. 3 and 4, to test the battery backup unit 26. As will be described in more detail below, the testing method includes periodically interrupting the power from the external power source 24 to the fan unit 34 on fan power rail 40 while the fan unit 34 is supplied power on the fan rail 40 from the battery backup unit 26 while the fan unit is operated under full fan speed to thereby test the capacity of the battery backup unit 26 while the external power source 24 maintains power on the CPU power rail 42 to the electrical components (e.g., the storage processor 16 thus enabling the storage processor to continue uninterrupted control of the data transfer between the host computer/server 12 and the bank of disk drives 14.

More particularly, the power supply 22 is adapted for coupling to the AC power supply 24 external of the enclosure 20. The output of the power supply 22 is here 12 volts dc. The 12 volt output of the power supply 22 is fed to the pair of power OR'ing circuits 30, 32 and to the battery backup unit 26. The 12 volts fed to the battery backup units 26 is used to charge such unit 26. The output of the battery backup unit 26, here also 12 volt dc or less, is also fed as inputs to the pair of power OR'ing circuits 30, 32, as shown.

With regard to OR'ing circuit 30, either the output of the power supply 22 or the output of the battery backup unit 26 is coupled to the fan power rail 40 selectively in accordance with a control signal produced by the CPU Module Power Controller 28 on the fan power control line 44. As will be described in more detail hereinafter, in the absence of a detected failure in the output of the power supply 22 or when the battery backup unit 26 is being tested (as will be described below and in connection with FIG. 3), the output of the power supply 22 is coupled through the power Or'ing circuit 30 to power the fan unit 34; however, if there is a detected fault in the power supply 22 output or during the testing of the battery backup unit 26, the battery backup unit 26 is coupled through the power Or'ing circuit 30 to the fan power rail.

With regard to OR'ing circuit 32, either the output of the power supply 22 or the output of the battery backup unit 22 is coupled to the CPU power rail 42 selectively in accordance with a control signal produced by the CPU Module Power Controller 28 on the CPU power control line 48. In the absence of a detected failure in the output of the power supply 22, the output of the power supply 22 is coupled through the power Or'ing circuit 32 to the CPU power rail to power the storage processor 16; however, if there is a detected fault in the power supply 22 output, the battery backup unit 26 is coupled through the power Or'ing circuit 30 to the CPU power rail 42 to power the storage processor 16.

The status of the battery backup unit 26 is fed to the CPU Module Power Controller 28, as shown. The CPU Module Power Controller 28 also monitors the output of the fan power rail 40 voltage and also monitors the CPU power rail 42 voltage. The CPU Module Power Controller 28 also monitors the current supplied to the Fan Unit 34 from the fan power rail 40. The CPU Module Power Controller 28 also provides the fan control signal on line 50 to the fan unit 34 and also monitors the actual fan speed of the fan unit 34 on line 52.

As noted briefly above, the CPU Module Power Controller 28 is programmed in accordance with the flowchart in FIG. 3, to test the battery backup unit 26 by periodically interrupting the power supply 22 to the fan unit 34 while the fan unit 34 is supplied power from the battery backup unit 26 and while the power supply 22 maintains power to the storage processor 16.

Referring now to FIG. 3, a flow chart of the operation of the components in the enclosure 20 (FIG. 2) is shown. Thus, as shown, the power supply 22 supplies power to both the fan power rail 40 and to the CPU power rail 42. The method then detects whether a battery backup unit 28 error has been logged. If an error has been logged, the battery backup unit 26 is replaced. If no error has been logged, the power supply 22 continues to supply power to both the fan power rail 40 and to the CPU power rail 42 and the method determines whether it is time to perform the battery backup test. If not, the power supply 22 continues to supply power to both the fan power rail 40 and to the CPU power rail 42; otherwise, the method performs the battery backup test as described in more detail below in FIG. 4. If the test indicates that the battery backup unit has adequate capacity, the power supply 22 continues to supply power to both the fan power rail 40 and to the CPU power rail 42 and the process repeats. On the other hand, it the battery back up unit is found by the test to have inadequate power, it is replaced.

Referring now to FIG. 4, a flow chart of the operation of the components in the enclosure 20 (FIG. 2) is shown for each period of testing of the battery backup unit 26. Thus, at the start of each one of the periodic battery backup unit 22 tests, the CPU Module Power Controller 28 detects the status of the battery backup unit 26. If there is a fault in the battery backup unit 22, an error is logged and the power supply 22 supplies power to the fan power rail 40 and to the CPU power rail 42. On the other hand, if there is no fault in the battery backup unit 22, the CPU Module Power Controller 28 detects whether the battery backup unit 22 is operating at full capacity. If not, an error is logged and the power supply 22 supplies power to the fan power rail 40 and to the CPU power rail 42. On the other hand, if there the battery backup unit 26 is at full capacity, the CPU Module Power Controller 28 detects whether the battery backup unit 26 is operating at full capacity, the CPU Module Power Controller 28 detects, from the sensed fan speed whether the fans are running. If not, an error is logged and the power supply 22 supplies power to the fan power rail 40 and to the CPU power rail 44. On the other hand, if there the fans are running, the CPU Module Power Controller 28 detects whether the fans are operating a full fan speed.

If the fans are detected as operating at full fan speed, the CPU Module Power Controller 28 enables, via the fan power control signal fed to the power OR'ing circuit 30, the battery backup unit 26 to supply power to fan power rail 40 and hence to the fans while the power supply 22 continues to supply power to the CPU power rail 42 and hence the power supply 22 continues to provide power to the storage processor 16.

On the other hand, if the fans are detected as not operating at full speed: (1) the CPU Module Power Controller 28 enables, via the fan power control signal fed to the power OR'ing circuit 30, the battery backup unit 26 to supply power to fan power rail 40 and hence to the fans while the power supply 22 continues to supply power to the CPU power rail 40 and hence the power supply 22 continues to provide power to the storage processor 16; and (2) the CPU Module Power Controller 28 drives the fans to operate at full speed. Thus, the battery backup unit is tested under full fan speed load.

More particularly, with the fans operating at full speed and powered by the battery backup unit 26, the CPU Module Power Controller 28 determines whether the actual fan speed, voltage and/or current are above pre-set targets for a predetermined period of time (here set by a fan test timer). Thus, the ability of the battery backup unit 26 to provide the requisite power to the fans is tested.

If the battery backup unit 26 is unable to provide the requisite power to the fans, a battery backup unit capacity failure is logged and, as is true in response to any logged error, the CPU Module Power Controller 28 operates the OR'ing circuit 30 to enable the power supply 22 to provide power to the fan power rail 40 and hence to the fans. That is, the battery backup unit 26 is removed from the fan power rail, the fans speeds are returned to the appropriate, non-test mode setting, and the battery backup unit test is terminated.

On the other hand, if the battery backup unit 26 is able to provide the requisite power to the fans, a battery backup unit test success is logged and the CPU Module Power Controller 28 operates the power OR'ing circuit 30 to enable the power supply 22 to provide power to the fan power rail 40 and hence to the fans. That is, the battery backup unit 26 is removed from the fan power rail 40 until the next battery backup unit 26 test period, the fans speeds are returned to the appropriate, non-test mode setting, and the battery backup unit 26 test is terminated for this test period until the next test period. In the intervals between test periods, the battery backup unit 26 continues to be recharged as needed by power supply 22 and monitored by CPU Module Power Controller 28.

A number of embodiments of the invention have been described. Nevertheless, it will be understood that various modifications may be made without departing from the spirit and scope of the invention. Accordingly, other embodiments are within the scope of the following claims.

What is claimed is:

1. A method for testing a battery backup unit used to power electronic components stored in an enclosure, such enclosure including a cooling system having a fan to cool the electronic components, such electrical components and said fan being powered by a power supply and, in the event of a detected failure of the power supply, to provide proper power, such electrical components and said fan being powered by the battery backup unit, such method comprising:
periodically using said fan as a load for testing the battery backup unit comprising periodically interrupting the power from the power supply to said fan while said fan is supplied power from the battery backup unit to test the battery backup unit while the power supply maintains power to the electrical components.

2. The method recited in claim 1 wherein the fan is operated at the maximum fan speed possible during the test.

3. The method recited in claim 1 wherein the periodic testing comprises:
determining whether the fan is operating at maximum speed prior to the testing and:
if the fan is at maximum operating speed, interrupting the power from the power supply to the fan while the fan is supplied power from the battery backup unit to test the battery backup unit while the power supply maintains power to the electrical components;
whereas if the fan is not at the maximum operating speed, operating the fan at the maximum operating speed and then, while at the maximum operating speed, using the fan as the load for testing the battery backup while the fan is supplied power from the battery backup unit to test the battery backup unit while the power supply maintains power to the electrical components.

4. A system interface for transferring data between a host computer/server and a bank of disk drives, the system comprising:
an enclosure, such enclosure having therein:
a storage processor for controlling data transfer between the host computer/server and the disk drive;
a power supply;
a battery backup unit fed by the power supply;
a fan unit;
a controller;
a first switch fed by the power supply and the battery backup unit, such controller coupling either the power supply or the battery backup unit to the fan unit selectively in accordance with a fan power control signal produced by the controller;
a second switch fed by the power supply and the battery backup unit, such controller coupling either the power supply or the battery backup unit to the storage processor selectively in accordance with a CPU power control signal produced by the controller; and
wherein the controller periodically provides a test load for the battery backup unit by periodically operating the first switch to decouple the power supply from the fan unit while coupling the battery backup unit to the power the fan unit with the fan unit providing the only test load for the battery backup unit while coupling the power supply through the second switch to power the storage processor.

5. The system interface recited in claim 4 wherein the controller operates at the maximum fan speed possible when the battery backup unit is periodically coupled to the fan.

6. The method recited in claim 4 wherein the periodic testing comprises:
determining whether the fan unit is operating at maximum speed prior to the testing and:
if the fan unit is at maximum operating speed, interrupting the power from the power supply to the fan unit while the fan unit is supplied power from the battery backup unit to test the battery backup unit while the power supply maintains power to the electrical components;
whereas if the fan unit is not at the maximum operating speed, operating the fan unit at the maximum operating speed and then, while at the maximum operating speed, using the fan unit as the load for testing the battery backup while the fan unit is supplied power from the battery backup unit to test the battery backup unit while the power supply maintains power to the electrical components.

7. The system interface recited in claim 4 wherein the cooling unit comprises a fan cooling unit.

8. A method for testing a battery backup unit used to power electronic components stored in an enclosure, such enclosure including a cooling system to cool the electronic components, such electrical components and said cooling system being powered by a power supply and, in the event of a detected failure of the power supply, to provide proper power, such electrical components and said cooling system being powered by the battery backup unit, such method comprising:

periodically using said cooling system as a load for testing the battery backup unit comprising periodically interrupting the power from the power supply to said cooling system while said cooling system is supplied power from the battery backup unit to test the battery backup unit while the power supply maintains power to the electrical components.

9. The method recited in claim 8 wherein the cooling system comprises a fan.

10. A system interface for transferring data between a host computer/server and a bank of disk drives, the system comprising:

an enclosure, such enclosure having therein:
        a storage processor for controlling data transfer between the host computer/server and the disk drive;
        a power supply;
        a battery backup unit fed by the power supply;
        a cooling unit;
        a controller;
        a first switch fed by the power supply and the battery backup unit, such controller coupling either the power supply or the battery backup unit to the cooling unit selectively in accordance with a cooling unit power control signal produced by the controller;
        a second switch fed by the power supply and the battery backup unit, such controller coupling either the power supply or the battery backup unit to the storage processor selectively in accordance with a CPU power control signal produced by the controller; and
    wherein the controller periodically provides a test load for the battery backup unit by periodically operating the first switch to decouple the power supply from the cooling unit while coupling the battery backup unit to the power the cooling unit with the cooling unit providing the only test load for the battery backup unit while coupling the power supply through the second switch to power the storage processor.

\* \* \* \* \*